(12) United States Patent
Oyamada

(10) Patent No.: US 6,999,409 B2
(45) Date of Patent: Feb. 14, 2006

(54) OSI TUNNEL ROUTING METHOD AND THE APPARATUS

(75) Inventor: Hisashi Oyamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 944 days.

(21) Appl. No.: 09/997,114

(22) Filed: Nov. 29, 2001

(65) Prior Publication Data

US 2003/0031125 A1     Feb. 13, 2003

(30) Foreign Application Priority Data

Aug. 9, 2001    (JP)  ............................. 2001-242517

(51) Int. Cl.
     *H04J 1/16*      (2006.01)

(52) U.S. Cl. ...................... 370/218; 370/228; 370/352; 370/389

(58) Field of Classification Search ................ 370/218, 370/228, 352, 389, 401, 392, 467, 903
See application file for complete search history.

(56) References Cited

U.S. PATENT DOCUMENTS 6,778,541 B2 *    8/2004    Houston et al. ............ 370/401

* cited by examiner

*Primary Examiner*—Chi Pham
*Assistant Examiner*—Alexander O. Boakye
(74) *Attorney, Agent, or Firm*—Katten Muchin Rosenman LLP

(57) ABSTRACT

An OSI tunnel routing method is provided, in which an IP packet which is encapsulated in an OSI packet is transmitted between transmission apparatuses in an OSI network each connected to an IP network. The transmission apparatuses exchange reachable IP network addresses and each own OSI network address, each of the transmission apparatuses generates an OSI tunnel table which includes the OSI network addresses and the reachable IP network addresses, and a first transmission apparatus which receives an request to access an IP address determines a second transmission apparatus which can transfer data for the IP address by referring to the OSI tunnel table, and generates an OSI tunnel between the first transmission apparatus and the second transmission apparatus.

18 Claims, 19 Drawing Sheets

FIG.6

| OFFSET | FIELD NAME | |
|---|---|---|
| +0 | NETWORK LAYER PROTOCOL IDENTIFIER(0x??) | ... PROTOCOL ID OF ISO8473 |
| +1 | LENGTH | ... DATA LENGTH |
| +2 | | |
| +3 | VERSION | ... VERSION OF PROTOCOL |
| +4 | LIFETIME | ... LIFETIME OF PDU |
| +5 | PDU TYPE(0x01) | |
| +6 | VERSION | ... VERSION OF PDU TYPE |
| +7 | RESERVE | |
| +8 | SOURCE NSAP ADDRESS | |
| +27 | NUMBER OF REACHABLE NETWORK ADDRESS | |
| +28 | NETWORK ADDRESS #1 | ... REACHABLE NETWORK ADDRESS |
| +29 | METRICS #1 | ... METRICS TO NETWORK |
| ... | ... | |
| +27+2n | NETWORK ADDRESS #n | |
| +28+2n | METRICS #n | |
| +29+2n | HOLDING TIME | |

FIG.7

| OFFSET | FIELD NAME | |
|---|---|---|
| +0 | PROTOCOL IDENTIFIER (0x01) | ··· AUTOMATIC OSI TUNNEL PROTOCOL ID |
| +1 | LENGTH | ··· DATA LENGTH |
| +2 | RESERVED | |
| +3 | RESERVED | |
| +4 | SOURCE NSAP ADDRESS | |
| +24 | REACHABLE NETWORK ADDRESS | |
| +28 | NETWORK MASK | |
| +29 | METRICS | |
| +30 | DELETE FLAG | |
| +31 | RESERVED | |

FIG.8

| OFFSET | FIELD NAME | |
|---|---|---|
| +0 | PROTOCOL IDENTIFIER (0x02) | ... AUTOMATIC OSI TUNNEL PROTOCOL ID |
| +1 | LENGTH | ... DATA LENGTH |
| +2 | RESERVED | |
| +4 | SOURCE NSAP ADDRESS | |
| +24 | REACHABLE NETWORK ADDRESS | |
| +28 | NETWORK MASK | |
| +29 | METRICS | |
| +30 | DELETE FLAG | |
| +31 | STATUS (0x00/0x01) | |

FIG.9

| OFFSET | FIELD NAME | |
|---|---|---|
| +0 | PROTOCOL IDENTIFIER (0x03) | ... AUTOMATIC OSI TUNNEL PROTOCOL ID |
| +1 | LENGTH | ... DATA LENGTH |
| +2 | RESERVED | |
| +3 | | |
| +4 | SOURCE NSAP ADDRESS | |
| +24 | REACHABLE NETWORK ADDRESS | |
| +28 | NETWORK MASK | |
| +29 | METRICS | |

FIG.10

| OFFSET | FIELD NAME | |
|---|---|---|
| +0 | PROTOCOL IDENTIFIER (0x04) | ··· AUTOMATIC OSI TUNNEL PROTOCOL ID |
| +1 | LENGTH | ··· DATA LENGTH |
| +2 | RESERVED | |
| +3 | RESERVED | |
| +4 | SOURCE NSAP ADDRESS | |
| +24 | REACHABLE NETWORK ADDRESS | |
| +28 | NETWORK MASK | |
| +32 | METRICS | |
| +33 | STATUS (SUCCESS:0x00/FAIL:0x01) | |

FIG.11

| OFFSET | FIELD NAME | |
|---|---|---|
| +0 | PROTOCOL IDENTIFIER (0x05) | ... AUTOMATIC OSI TUNNEL PROTOCOL ID |
| +1 | LENGTH | ... DATA LENGTH |
| +2 | RESERVED | |
| +3 | RESERVED | |
| +4 | SOURCE NSAP ADDRESS | |
| +24 | REACHABLE NETWORK ADDRESS | |
| +27 | NETWORK MASK | |
| +28 | METRICS | |
| +29 | RESERVED | |

FIG.12

| OFFSET | FIELD NAME | |
|---|---|---|
| +0 | PROTOCOL IDENTIFIER (0x06) | ... AUTOMATIC OSI TUNNEL PROTOCOL ID |
| +1 | LENGTH | ... DATA LENGTH |
| +2 | RESERVED | |
| +3 | RESERVED | |
| +4 | SOURCE NSAP ADDRESS | |
| +24 | REACHABLE NETWORK ADDRESS | |
| +28 | NETWORK MASK | |
| +32 | METRICS | |
| +33 | STATUS (ACTIVE:0x00/INACTIVE0x01) | |

FIG.13

| NO. | REACHABLE NETWORK ADDRESS | NETWORK MASK | NSAP ADDRESS | STATUS | DELETABLE |
|-----|---------------------------|--------------|--------------|--------|-----------|
| 1   |                           |              |              |        |           |
| ... |                           |              |              |        |           |
| ... |                           |              |              |        |           |
| N   |                           |              |              |        |           |

FIG.15

IP ROUTING TABLE

| NO. | REACHABLE NETWORK ADDRESS | NETWORK MASK | ROUTER IP ADDRESS | METRICS |
|---|---|---|---|---|
| 1 | 10.21.100.0 | 255.255.255.0 | 10.21.100.10 | 1 |
| 2 | 10.21.200.0 | 255.255.255.0 | 10.21.100.10 | 2 |
| 3 | | | | |

FIG.16

OSI TUNNEL TABLE

| NO. | REACHABLE NETWORK ADDRESS | NETWORK MASK | NSAP ADDRESS | STATUS |
|---|---|---|---|---|
| 1 | 10.21.100.0 | 255.255.255.0 | NSAP-3 | INACTIVE |
| 2 | 10.21.200.0 | 255.255.255.0 | NSAP-3 | INACTIVE |
| 3 | | | | |
| 4 | | | | |
| 5 | | | | |

OSI TUNNEL ROUTING METHOD AND THE APPARATUS

BACKGROUND OF THE INVENTION

1. Field of the Invention

The present invention relates to an OSI tunnel routing method and the apparatus. More particularly, the present invention relates to an OSI tunnel routing method and the apparatus in a transmission system for a carrier.

2. Description of the Related Art

In a SONET (Synchronous optical Network) communication network, a transmission apparatus performs ADD/DROP (multiplex/demultiplex) of communication data, network state monitoring, communication path recovery when a failure occurs in the network, and the like. The transmission apparatus is managed by a monitoring apparatus called as an NMS (network management system), in which DCC byte which is provided in a header of SONET is used for management of communication between the NMS and the transmission apparatus and between transmission apparatuses. Generally, OSI (Open Systems Interconnect) is used for the protocol. OSI is formed by a stack of protocols including TL1, X.226, X.225, TP4, CLNP/IS-IS, LAPD, DCC as shown in FIG. 1. In this specification, a transmission apparatus which is connected to an OSI network is called an NE (Network Element) or a GNE (Gateway Network Element).

In the following, an OSI tunnel function will be described with reference to FIG. 2 and FIG. 3 taking an FTP service as an example. In FIG. 2, an IP (Internet Protocol) network in an NMS 10 side is IP-1, and an IP network in a GNE 12 side is IP-2. The IP-1 and the IP-2 are not directly connected by the IP protocol. When the NMS 10 in the IP-1 uses a service of an FTP (File Transfer Protocol) server 14 in the IP-2, an FTP connection request from the NMS 10 needs to be reached to the FTP server 14. However, since a Mediated-GNE 11 and a GNE 12 are connected by an OSI DCN (Data Communication Network) which does not support the TCP/IP protocol, the request can not be reached to the FTP server 14.

However, if the Mediated-GNE 11 can transfer an IP packet including the FTP connection request to the GNE 12 in the IP-2 side by using OSI, this problem can be solved. That is, when the Mediated-GNE 11 receives an IP packet destined to an IP address of the FTP sever 14, the IP packet is encapsulated by an OSI packet so that the IP packet is transferred to the GNE 12 of the IP-2 side by using OSI. Then, the IP packet is extracted from the OSI packet in the GNE 12 in the IP-2 side so that the IP packet is sent over the IP network of the IP-2. The FTP server 14 can send a response to this request to the NMS 10 in the same way. The OSI packet is a packet in which NSEL value=0x89 (0x indicates hexadecimal notation) is added to CLNP (Connection Less Network Protocol) of ISO8473 standard. FIG. 4 shows protocol stacks in a route on which data passes through the OSI tunnel.

In the conventional transmission apparatus, the OSI tunnel is statically established by a TL1 command. More particularly, as shown in FIG. 3, an IP address of the FTP server in the IP-2 and an NSAP (Network Service Access Point) address which is an OSI network address of the GNE 12 are specified as parameters for OSI tunnel setting for the Mediated-GNE 11 side. As for the GNE 12 in the IP-2, the IP address of the NMS 10 in the IP-1 and an NSAP address of the Mediated-GNE 11 should be specified. Thus, the OSI tunnel should be set by using the TL1 command in the GNEs of both IP networks.

Thus, as for the OSI tunnel function of the conventional transmission apparatus, an administrator sets or deletes the OSI tunnel function statically. Therefore, management of the transmission apparatus becomes complicated, and there is a possibility of a setting error due to manual setting. In addition, when OSI tunnels which are not used for a long time remain, there is a problem in that traffic can not be used efficiently due to occupation of bandwidth by the remained OSI tunnel.

SUMMARY OF THE INVENTION

An object of the present invention is to provide an OSI tunnel routing method and the apparatus in which the setting error due to manual setting and the complication of management are solved and the traffic of the OSI tunnel becomes efficient.

The above object is achieved by an OSI tunnel routing method in which an IP packet which is encapsulated in an OSI packet is transmitted between transmission apparatuses each connected to an IP network in which the transmission apparatuses form an OSI network, the method including the steps of:

the transmission apparatuses exchanging reachable IP network addresses and each own OSI network address on the OSI network;

each of the transmission apparatuses generating an OSI tunnel table which includes OSI network addresses of the transmission apparatuses and the reachable IP network addresses; and a first transmission apparatus in the transmission apparatuses which receives an request to access an IP address determining a second transmission apparatus which can transfer data for the IP address by referring to the OSI tunnel table, and generating an OSI tunnel between the first transmission apparatus and the second transmission apparatus.

According to the above invention, a setting error or management complexity due to manual setting can be resolved.

BRIEF DESCRIPTION OF THE DRAWINGS

Other objects, features and advantages of the present invention will become more apparent from the following detailed description when read in conjunction with the accompanying drawings, in which:

FIG. 6 shows a format of a data part of an OSI tunnel propagation command;

FIG. 7 shows a format of a data part of an OSI tunnel generation request command;

FIG. 8 shows a format of a data part of an OSI tunnel generation completion response;

FIG. 9 shows a format of a data part of an OSI tunnel deletion request command;

FIG. 10 shows a format of a data part of an OSI tunnel deletion completion response;

FIG. 11 shows a format of a data part of an OSI tunnel state check command;

FIG. 12 shows a format of a data part of an OSI tunnel state check response;

FIG. 13 shows a format of an OSI tunnel table;

FIG. 15 shows an IP routing table;

FIG. 16 shows an OSI tunnel table;

DETAILED DESCRIPTION OF THE PREFERRED EMBODIMENTS

Figure 1:
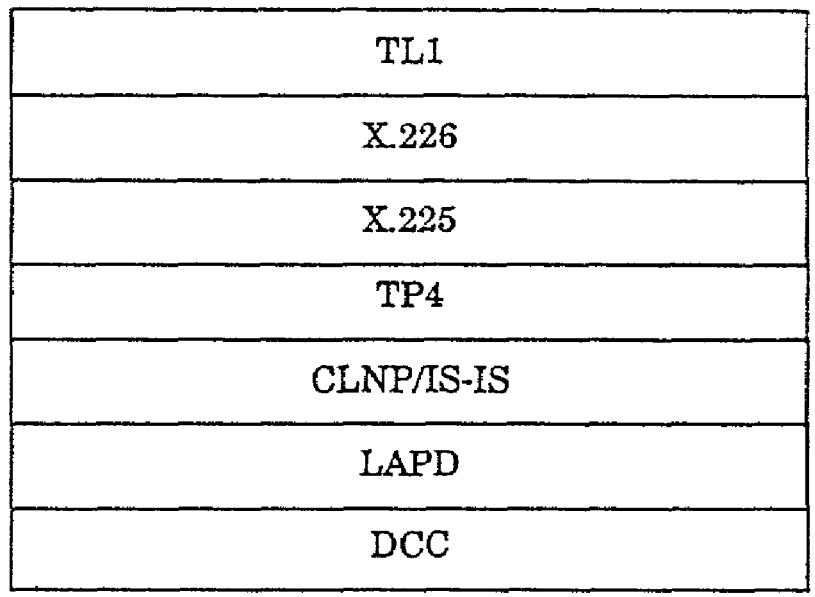
FIG. 1 shows a stack of protocols forming OSI.
Figure 2:
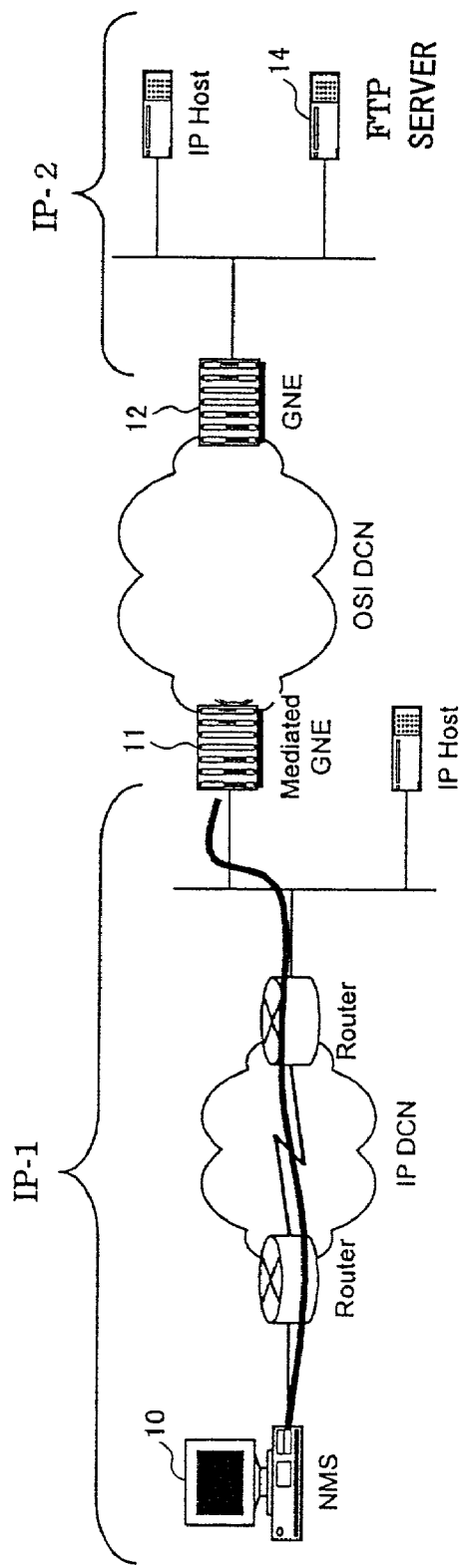
FIG. 2 is a figure for explaining an OSI tunnel function.
Figure 3:
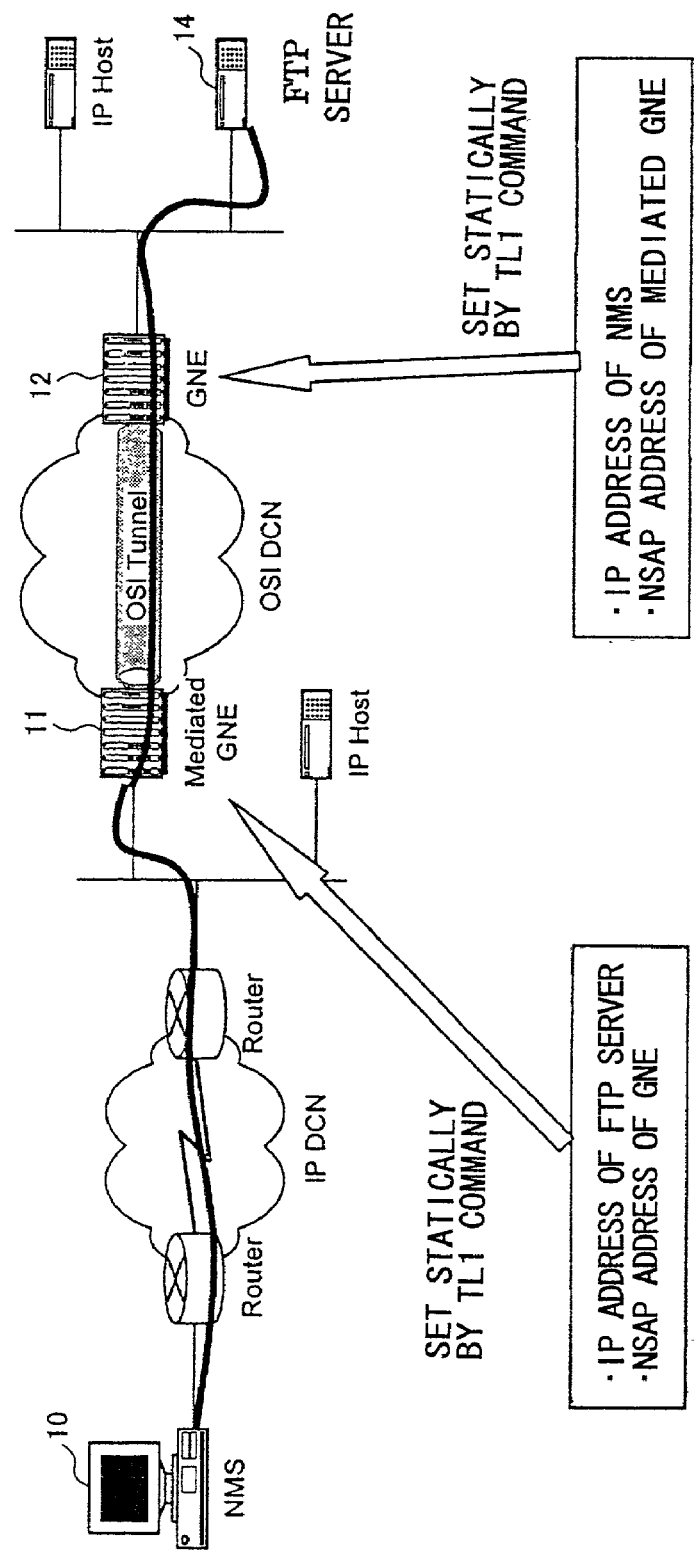
FIG. 3 is a figure for explaining an OSI tunnel function.
Figure 4:
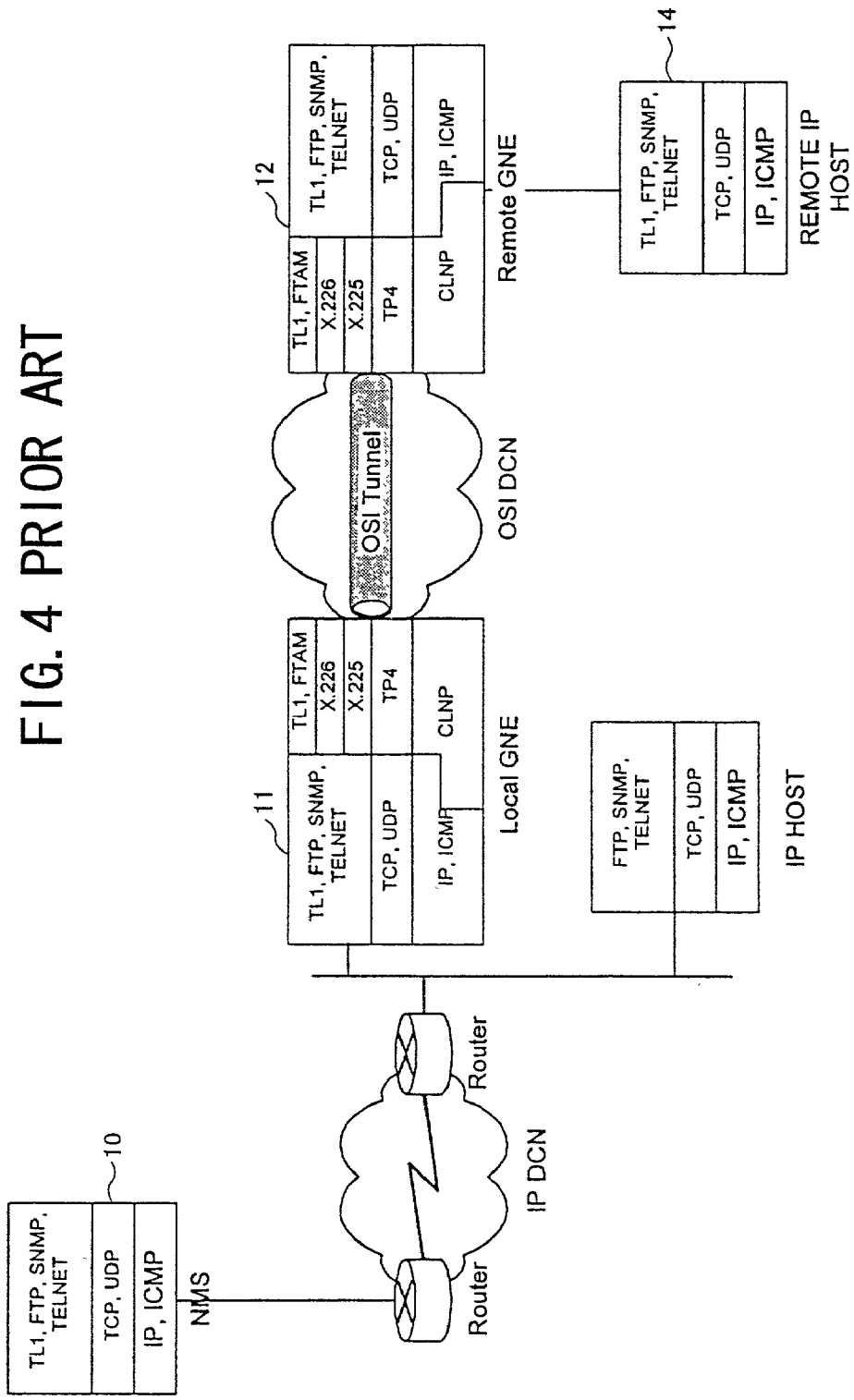
FIG. 4 shows protocol stacks in a route on which data passes through an OSI tunnel.
Figure 5:
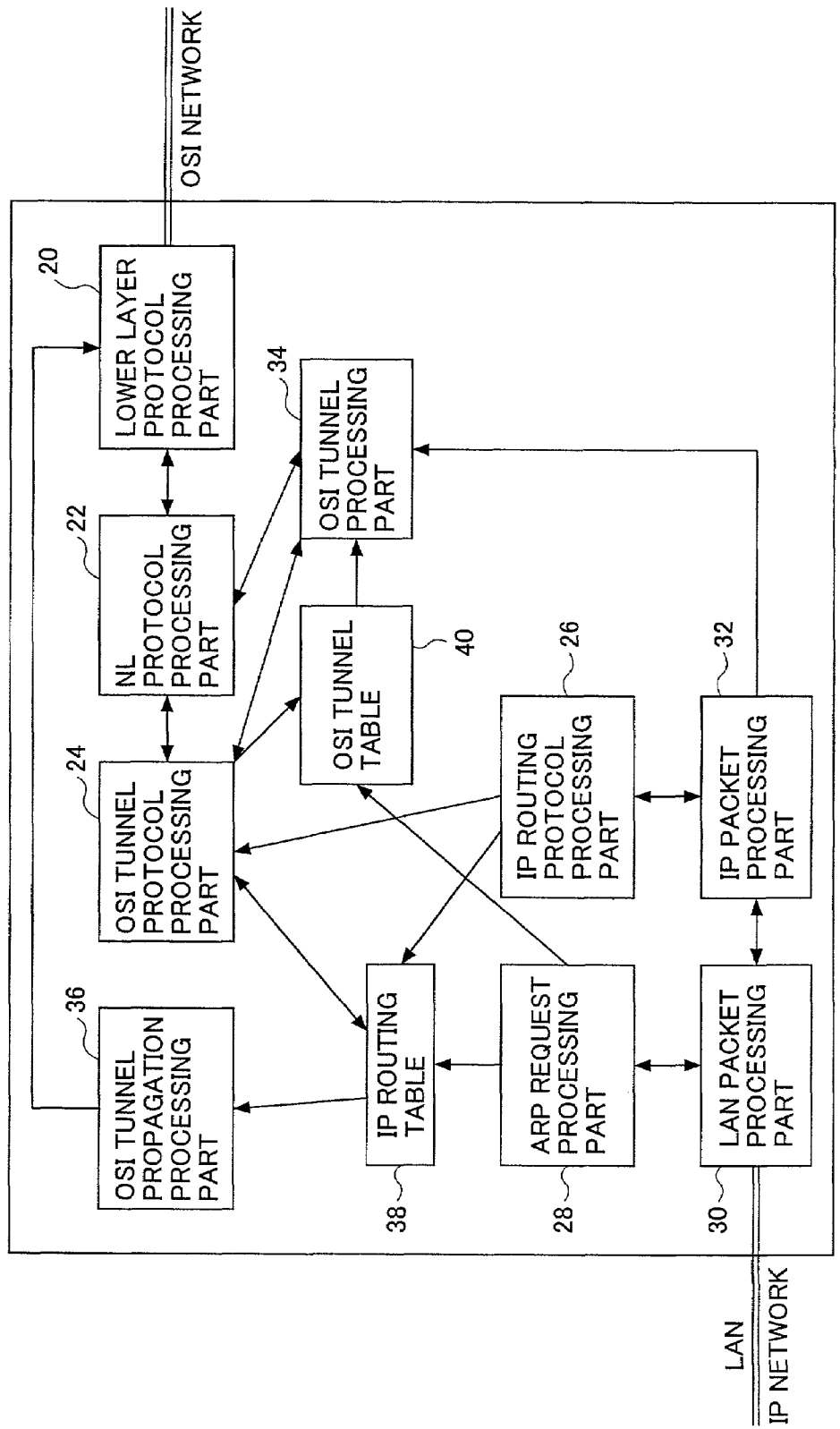
FIG. 5 shows a block diagram of an example of an OSI tunnel routing apparatus of the present invention.

FIG. 5 shows a block diagram of an example of an OSI tunnel routing apparatus of the present invention. In the figure, a lower layer protocol processing part 20 processes protocols below the network layer (which is abbreviated to NL hereinafter) which are extracted from a section DCC byte of the SONET overhead or a LAN frame.

The lower layer protocol processing part 20 (1) passes a data part to an NL protocol processing part 22, (2) adds data of lower protocols to a packet received from the NL protocol processing part 22 and sends the packet, (3) adds data of lower protocols to the packet received from an OSI tunnel propagation processing part 36 and sends the packet.

The NL protocol processing part 22 reads an NL protocol ID value of an ISO8473 packet of the network layer and transfers the packet to processing parts in the following way.

That is, (1) the NL protocol processing part 22 judges whether the protocol ID is an OSI tunnel propagation protocol (NLID=0xXX in ISO8473, which is a new value of the present invention for the OSI propagation protocol). When it is the OSI tunnel propagation protocol, the NL protocol processing part 22 passes the packet to an OSI tunnel protocol processing part 24.

(2) The NL protocol processing part 22 passes the packet to the OSI tunnel protocol processing part 24 when the NL protocol ID is a CLNP protocol and NSEL value is a new value (0x??) indicating an automatic OSI tunnel protocol and received from the lower layer protocol processing part 20.

(3) The NL protocol processing part 22 passes the packet to the OSI tunnel processing part 34 when the NL protocol ID is a CLNP protocol and when the NSEL value is 0x89 which indicates OSI tunnel data and received from the lower layer protocol processing part 20.

(4) The NL protocol processing part 22 passes the packet to the lower layer protocol processing part 20 when the packet is received from the OSI tunnel processing part 34, (5) passes the packet to the lower layer protocol processing part 20 when the packet is received from the OSI tunnel propagation processing part 36.

Automatic OSI tunnel protocols include following six commands and responses.

These are A. Automatic OSI tunnel protocol ID=0x01: OSI tunnel generation request command, B. Automatic OSI tunnel protocol ID-0x02:OSI tunnel generation completion response, C. Automatic OSI tunnel protocol ID=0x03:OSI tunnel deletion request command, D. Automatic OSI tunnel protocol ID=0x04:OSI tunnel deletion completion response, E. Automatic OSI tunnel protocol ID=0x05:OSI tunnel state check command, and F. Automatic OSI tunnel protocol ID=0x06:OSI tunnel state check response.

The OSI tunnel protocol processing part 24 processes the OSI tunnel propagation protocol and the automatic OSI tunnel protocol in the following way.

(1) The OSI tunnel protocol processing part 24 changes an OSI tunnel table 40 on the basis of a command of the automatic OS tunnel protocol and contents of the OSI tunnel propagation protocol received from the NL protocol processing part 22. When the received protocol is the OSI tunnel propagation protocol, the NE propagates the same information to adjacent NEs. Accordingly, the same information can be shared by the whole network.

(2) When the OSI tunnel protocol processing part 24 receives the automatic OSI tunnel protocol, a corresponding process will be performed.

(3) When the OSI tunnel generation request or the OSI tunnel deletion request is received from the OSI tunnel processing part 34, a corresponding command is sent to a corresponding remote NE.

(4) When a change request of IP routing information is received from the IP routing protocol processing part 26, the OSI tunnel protocol processing part 24 changes the OSI tunnel table.

The IP routing protocol processing part 26 processes the IP routing protocol in the following way.

(1) The IP routing protocol processing part 26 processes the IP routing protocol in an IP packet received from the IP packet processing part 32. When routing information is changed, the change is informed to the OSI tunnel protocol processing part 24.

An ARP (Address Resolution Protocol) request processing part 28 processes contents of the ARP request (address resolution request) received from the LAN packet processing part 30 in the following way.

(1) The ARP request processing part 28 returns a MAC address of its own NE as an ARP response when a destination IP address of the ARP request exists in the OSI tunnel table 40 and when the destination IP address is an NSAP address (OSI network address) of an NE other than the own NE.

The LAN packet processing part 30 processes a packet received from a LAN in the following way.

(1) The LAN packet processing part 30 passes a packet received from a LAN to the ARP request processing part 28 when the packet is an ARP packet.

(2) When the packet is an IP packet, the LAN packet processing part 30 passes the packet to the IP packet processing part 32.

The IP packet processing part 32 processes the IP packet in the following way.

(1) When the IP packet received from the LAN packet processing part 30 is destined for the own NE and is an IP routing protocol such as RIP and the like, the LAN packet processing part 30 passes the IP packet to the IP routing protocol processing part 26.

(2) When the IP packet received from the LAN packet processing part 30 is destined for the own NE and is for a service such as FTP and the like, the LAN packet processing part 30 passes the IP packet to a corresponding service processing part.

(3) When the IP packet is not destined for the own NE, the LAN packet processing part 30 determines whether the NE can perform routing of the packet by using the routing table 38. When it can perform routing, the LAN packet processing part 30 requests a corresponding interface to send the IP packet.

(4) When the corresponding interface is an OSI tunnel interface, the LAN packet processing part 30 passes the packet to the OSI tunnel processing part 34.

The OSI tunnel processing part 34 sends data for the OSI tunnel in the following way.

(1) The OSI tunnel processing part 34 encapsulates the IP packet received from the IP packet processing part 32 in a CLNP protocol, and adds an NSAP address of a destination NE (OSI tunnel exit NE) as a destination address to the encapsulated packet, and sends the encapsulated packet to the NL protocol processing part 22.

(2) When it is necessary to generate a new OSI tunnel in order to send the IP packet received from the IP packet processing part 32, the OSI tunnel processing part 34 sends an OSI tunnel generation request to the OSI tunnel protocol processing part 24.

(3) When there is no IP packet which uses an OSI tunnel for a predetermined time, the OSI tunnel processing part 34 requests the OSI tunnel protocol processing part 24 to delete the OSI tunnel.

The OSI tunnel propagation processing part 36 generates an OSI tunnel propagation protocol for propagating reachable IP network addresses and the NSAP address of the own NE for the OSI network by referring to the IP routing table 38 periodically.

The IP routing table 38 holds IP routing information obtained by a general IP routing protocol (RIP or OSPF and the like).

An OSI tunnel table 40 holds information on the reachable IP network addresses and the NSAP addresses of NEs which can reach IP network addresses.

Next, a format of the automatic tunnel protocol will be described. FIG. 6 shows a format of a data part of the OSI tunnel propagation command. The data part includes a protocol ID (0x??: this value is a new value of the present invention) of ISO8473, a data length, a protocol version, a lifetime of PDU (Protocol Data Unit), a PDU type, a PDU type version, reserved part, a source NSAP address, a number of reachable network addresses, reachable network addresses, metrics to the network (number of hops) and data holding time.

FIG. 7 shows a format of a data part of the OSI tunnel generation request command. The NL protocol ID of this command is 0x81 (CLNP). The data part includes the automatic OSI tunnel protocol ID (0x01: which means an OSI tunnel generation request command), a data length, a reserved part, a source NSAP address, a reachable network address (a mask of a subnetwork of a reachable network), a network mask, a metrics, a delete flag (which indicates whether the OSI tunnel can be deleted when it is not used for a predetermined time), and a reserved part.

FIG. 8 shows a format of a data part of the OSI tunnel generation completion response. The NL protocol ID of this command is 0x81 (CLNP). The data part includes the automatic OSI tunnel protocol ID (0x02: which means an OSI tunnel generation completion response), a data length, reserved part, a source NSAP address, a reachable network address, a network mask, a metrics, a delete flag, and a status (success:0x00/fail:0x01).

FIG. 9 shows a format of a data part of the OSI tunnel deletion request command. The NL protocol ID of this command is 0x81 (CLNP). The data part includes the automatic OSI tunnel protocol ID (0x03: which means an OSI tunnel deletion request command), a data length, a reserved part, a source NSAP address, a reachable network address, a network mask, and a metrics.

FIG. 10 shows a format of a data part of the OSI tunnel deletion completion response. The NL protocol ID of this command is 0x81 (CLNP). The data part includes the automatic OSI tunnel protocol ID (0x04: which means an OSI tunnel deletion completion response), a data length, a reserved part, a source NSAP address, a reachable network address, a network mask, a metrics and a status (success: 0x00/fail:0x01).

FIG. 11 shows a format of a data part of the OSI tunnel state check command. The NL protocol ID of this command is 0x81 (CLNP). The data part includes the automatic OSI tunnel protocol ID (0x05: which means an OSI tunnel state check command), a data length, a reserved part, a source NSAP address, a reachable network address, a network mask, a metrics and a reserved part.

FIG. 12 shows a format of a data part of the OSI tunnel state check response. The NL protocol ID of this command is 0x81 (CLNP). The data part includes the automatic OSI tunnel protocol ID (0x06: which means an OSI tunnel state check response), a data length, a reserved part, a source NSAP address, a reachable network address, a network mask, a metrics, a status (active:0x00/inactive:0x01) and a reserved part.

FIG. 13 shows a format of an OSI tunnel table. As shown in FIG. 13, each OSI tunnel is numbered in the OSI table. For each number, the OSI tunnel table includes a reachable IP network address, a subnetwork mask of the reachable IP network, an NSAP address of an NE which can reach to the IP network, a status (active/inactive), information (deletable) indicating whether the OSI tunnel can be deleted or not when the OSI tunnel is not used for a predetermined time.

Figure 14:
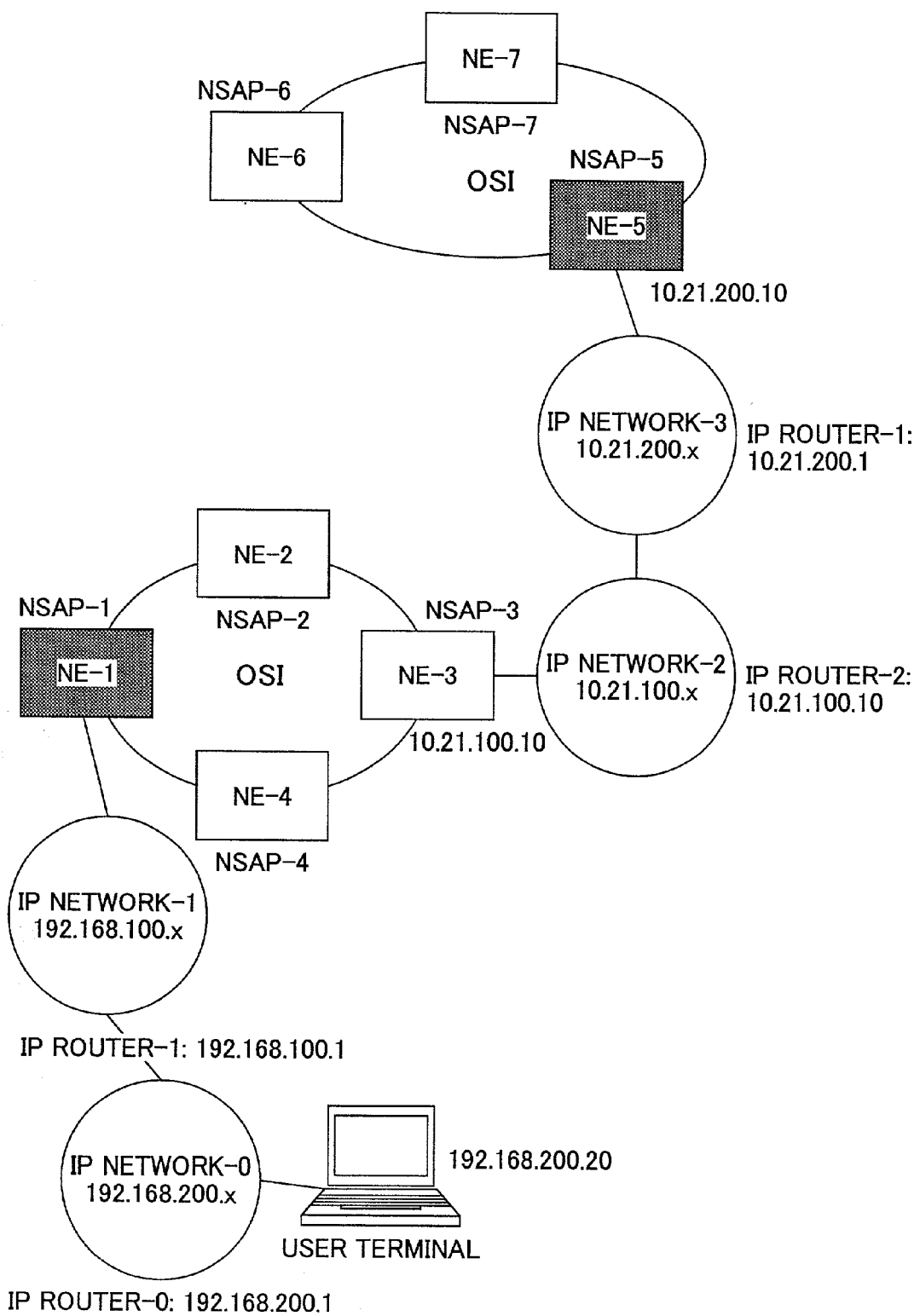
FIG. 14 shows a block diagram of an example of a network to which the present invention is applied.

FIG. 14 shows a block diagram of an example of a network to which the present invention is applied. In FIG. 14, the IP network and the OSI network are interconnected. In the figure, NE-1, NE-2, NE-3 and NE-4 form an OSI network, and NE-5, NE-6 and NE-7 form another OSI network.

In the following, a case will be described in which a user terminal (192.168.200.20) obtains a LAN port status (number of packets received by a corresponding interface in MIB information) of the NE-5 by using an SNMP (Simple Network Management Protocol) command, wherein an OSI network exists between the user terminal and the NE-5.

The NE-1 sends an SNMP command "GET 'mib-2.1p.ip-InReceives'" to a destination IP address (10.21.200.10). NE-3 implements an IP routing protocol and obtains reachable network information periodically from an IP router-2. Accordingly, the NE-3 holds reachable network addresses in the IP routing table 38. An example of the IP routing table 38 is shown in FIG. 15.

The OSI tunnel propagation processing part 36 in the NE-3 puts reachable network information extracted from the IP routing table 38 and its own NSAP address (NSAP-3) in an OSI tunnel propagation packet, and propagates the OSI tunnel propagation packet to the OSI network.

The NE-1 receives the OSI tunnel propagation packet from the NE-3 and stores the inside data of the packet into the OSI tunnel table 40. In the OSI tunnel table 40, combination of NSAP address of NE on the OSI network and IP network addresses which the NE can reach are stored. The information sent from the NE-3 includes the NSAP address of the NE-3, a network address (10.21.100.0) of the IP network-2 and a network address (10.21.200.0) of the IP network-3 which are reachable by the NE-3. This OSI tunnel table is shown in FIG. 16.

Since the NE-1 operates as an IP router in the IP network-1, the NE-1 informs the inside of the IP network-1 whether the networks (10.21.100.x) and (10.21.200.x) are reachable by using an existing IP routing protocol such as RIP. Thus, a router (a gateway) in the IP network-1 and a router (a gateway) in the IP network-0 connected to the IP network-1 can know that (10.21.200.x) can be reachable, in which x may be any number. According to this operation of the IP routing protocol. The IP router-0 transfers an SNMP packet sent from the user terminal to the IP router-1, and the IP router-1 transfers the SNMP packet to the NE-1.

In a different network configuration, if the user terminal sends an ARP request to the IP address of the NE-5, the ARP request processing part 28 of the NE-1 refers to the OSI tunnel table 40, and returns an ARP response which includes the MAC address of the NE-1. The IP host which received the ARP response sends an SNMP packet to the NE-1. After that, the NE-1 transfers the packet to the NE-5 by using the OSI tunnel.

The OSI tunnel protocol processing part 24 and the OSI tunnel processing part 34 of the NE-1 which received the SNMP packet destined for the NE-5 judges whether the packet is reachable by checking the destination IP address and the OSI tunnel table of FIG. 16. When the NE-5 judges that the packet is reachable, a CLNP packet to which the automatic OSI tunnel protocol PDU is added is sent to the NE-3, wherein the NSAP address is NSAP-3 and an ID of the automatic OSI protocol is assigned to NSEL in the CLNP packet.

The protocol ID of the automatic OSI protocol is the OSI tunnel generation request (0x01) as shown in FIG. 7. In this case, when there exist a plurality of routs reachable from NE-1 to NE-3, the NE-1 selects a route having the minimum cost for requesting OSI tunnel generation.

When the NE-3 receives the CLNP packet, the NE-3 checks the NSEL. Since it indicates the automatic OSI tunnel protocol, the NE-3 checks the command ID. Since it is 0x01, the NE-3 judges that the packet is an OSI tunnel generation request, and generates an OSI tunnel after checking that it can reach the destination IP subnetwork address shown in the automatic OSI protocol data by using the IP routing table 38. After completing OSI tunnel generation, the NE-3 puts an OSI tunnel generation completion response (automatic OSI tunnel protocol ID=0x02) shown in FIG. 8 in the CLNP packet, and returns the CLNP packet to the NE-1.

When the OSI tunnel protocol processing part 24 in the NE-1 receives the CLNP packet, the OSI tunnel protocol processing part 24 checks NSEL. Since it indicates the automatic OSI tunnel protocol, the OSI tunnel protocol processing part 24 checks the command ID. Since it is 0x02, the OSI tunnel protocol processing part 24 judges that the received packet indicates an OSI tunnel generation completion response and checks the result. Since the result is OK, the NE-1 generates an OSI tunnel, and encapsulates the SNMP packet received from the user terminal in a CLNP packet in which the NSAP address is NSAP-3 and a value (0x89) for OSI tunnel is assigned to NSEL. Then, the NE-1 sends the CLNP packet to the NE-3.

The NE-3 extracts the SNMP packet from the PDU (Protocol Data Unit) in the CLNP packet, and transfers the SNMP packet to the NE-5 according to the IP routing information. In the same way, a response for the SNMP command is encapsulated in the PDU of the CLNP in the NE-3, and is sent to the NE-1 via the OSI tunnel.

After the NE-1 receives the response of the SNMP, when the NE-1 detects that the OSI tunnel is not used for a predetermined time, the NE-1 sends an OSI tunnel deletion request command (automatic OSI tunnel protocol ID=0x03) to the destination NE of the OSI tunnel (NE-3 in this case) with data such as a subnetwork address of an interface to be deleted (these data are sent after being encapsulated in the CLNP protocol in which NSEL is an automatic OSI tunnel protocol).

When the NE-3 receives the OSI tunnel deletion request command, the NE-3 deletes the specified OSI tunnel, and writes data indicating success as a process result in the OSI tunnel deletion completion response shown in FIG. 10, and sends it to the NE-1.

When the NE-1 receives the OSI tunnel deletion completion response from the NE-3, the NE-1 checks that the OSI tunnel deletion is succeeded and deletes the corresponding OSI tunnel of the own NE.

Figure 17:
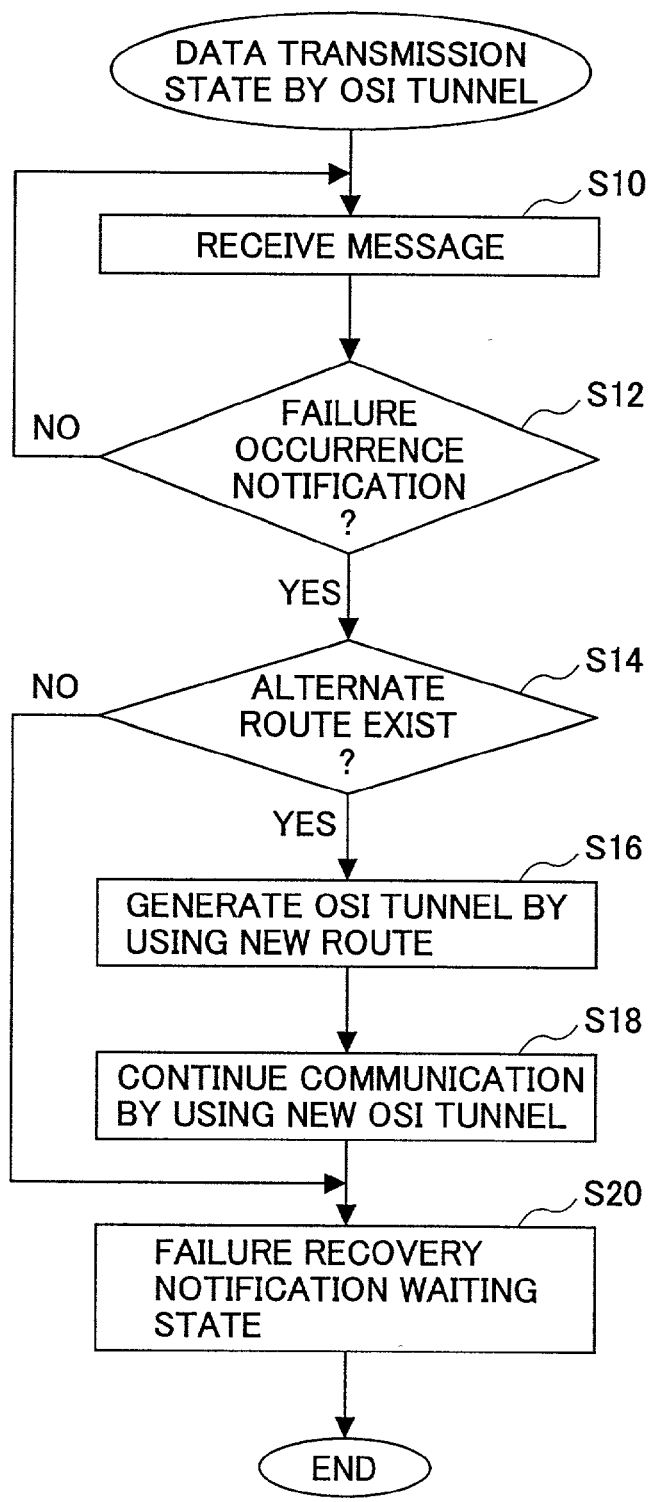
FIG. 17 shows a flowchart showing a route switching process.

FIG. 17 shows a flowchart showing a route switching process performed by the OSI tunnel protocol processing part 24 when a failure occurs in a route used by an OSI route in an OSI network. This process is performed when data transmission is performed by an already established OSI tunnel.

First, a message is received in step 10. Then, it is judged whether the received message is a notification of failure occurrence in the OSI tunnel in step 12. If the message is not the failure occurrence notification in the OSI tunnel, step 10 is performed repeatedly. On the other hand, the message is the failure occurrence notification in the OSI tunnel, it is judged whether there is an alternate route for the failed route in the OSI network in step 14.

When there is an alternative route, the OSI tunnel protocol processing part 24 generates an OSI tunnel by using a new route in step 16. In this case, when there are a plurality of alternative routes, the minimum cost route is selected. Then, data transmission is performed by using the new OSI tunnel in step 18. In step 20, the OSI tunnel protocol processing part 24 becomes in a failure recovery notification waiting state. Then, the process ends. When there is no alternative route in step 14, the OSI tunnel protocol processing part 24 becomes in a failure recovery notification waiting state in step 20. Then, the process ends.

Figure 18:
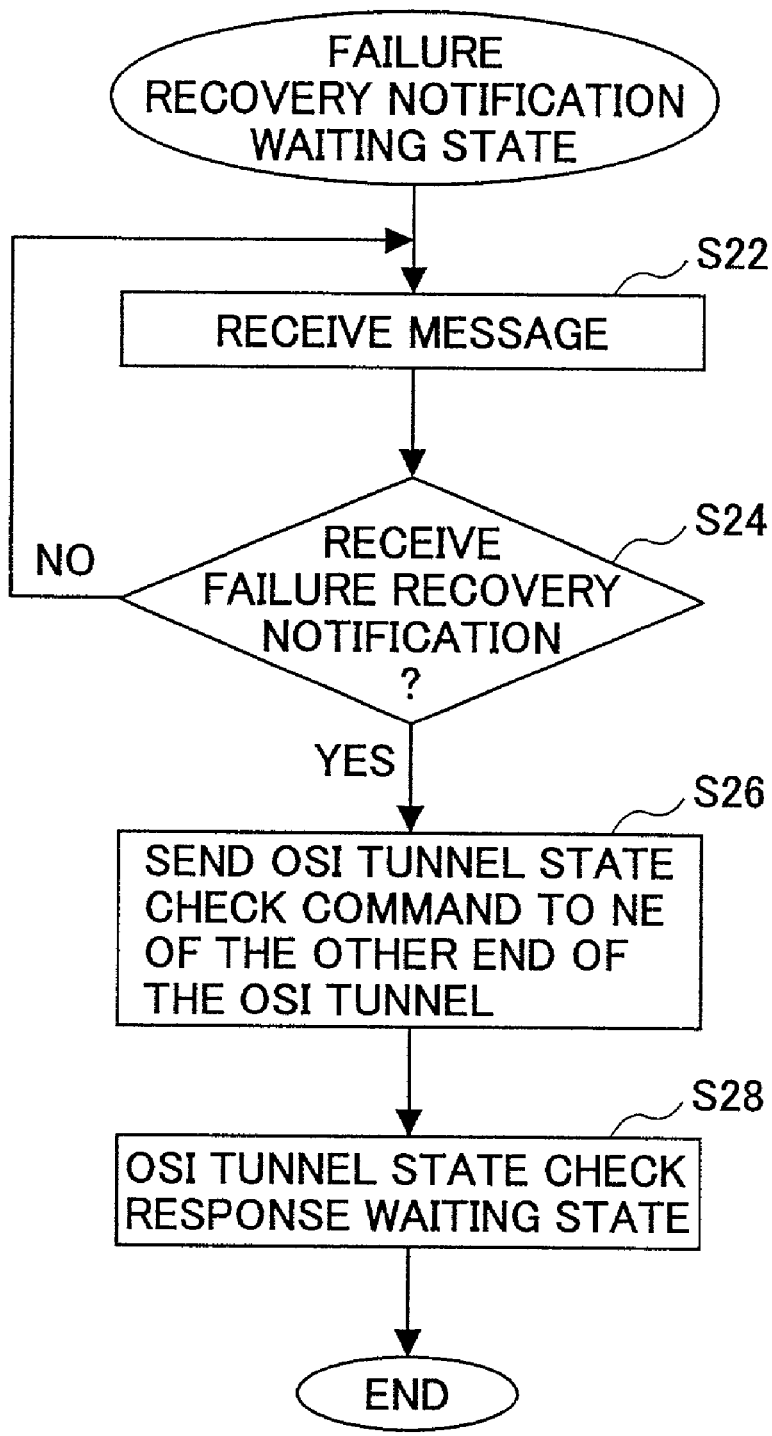
FIG. 18 shows a flowchart of a failure recovery waiting process.

FIG. 18 shows a flowchart of a failure recovery waiting process performed by the OSI tunnel protocol processing part 24. This process is performed after the OSI tunnel protocol processing part 24 becomes in the failure recovery notification waiting state in step 20. First, the OSI tunnel protocol processing part 24 receives a message in step 22. Then, it is judged whether the received message is a failure recovery notification from the OSI network. When it is not the failure recovery notification from the OSI network, the step 22 is performed repeatedly.

On the other hand, if the message is the failure recovery notification, the OSI tunnel protocol processing part 24 sends an OSI tunnel state check command shown in FIG. 11 to the NE at the other end of the OSI tunnel in which the failure occurs in step 26. Then, in step 28, the state becomes an OSI tunnel state check waiting state in which the OSI tunnel protocol processing part 24 waits for an OSI tunnel state check response. Then, the process ends.

Figure 19:
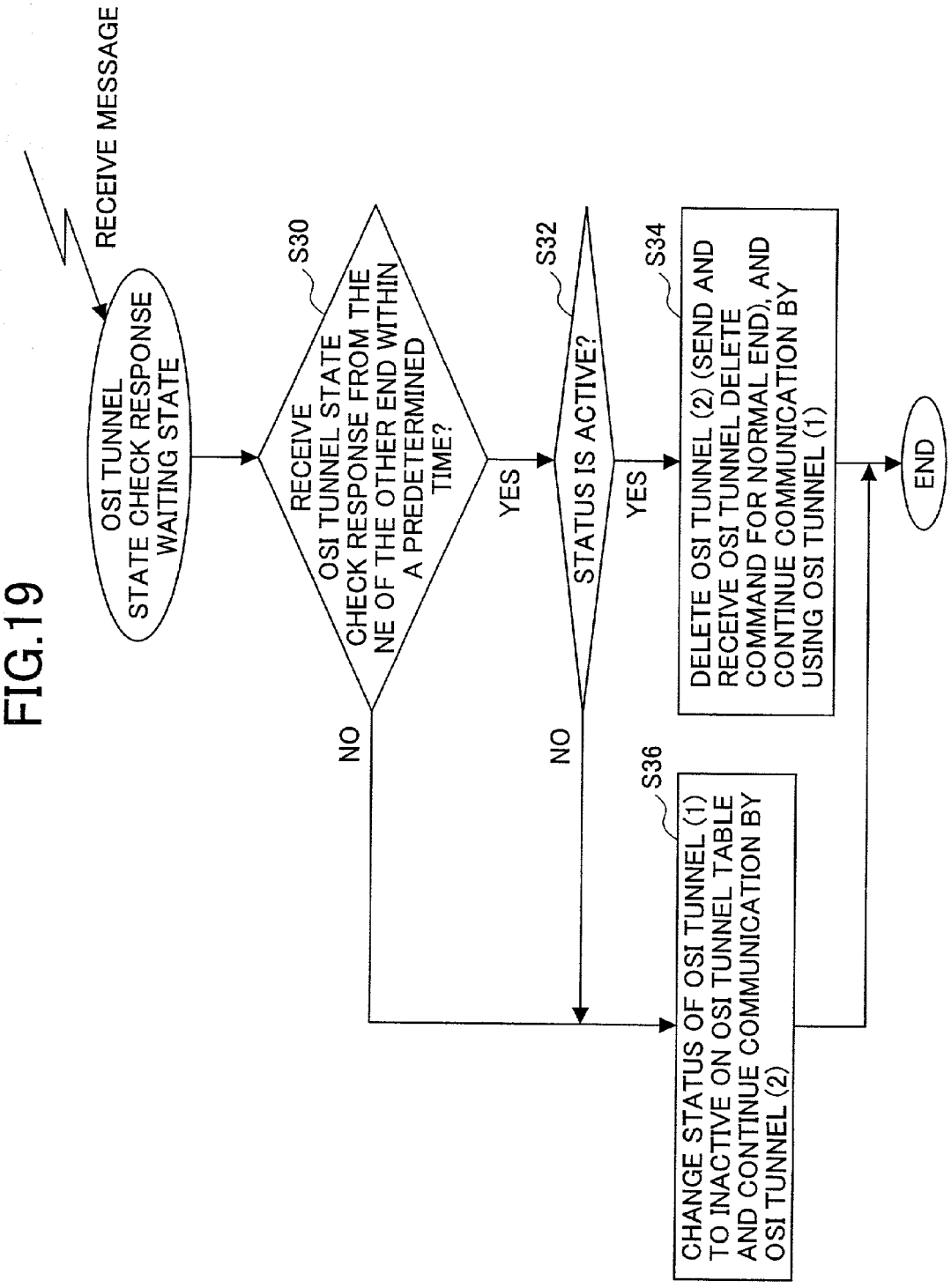
FIG. 19 shows a flowchart of an OSI tunnel state check response waiting process.

FIG. 19 shows a flowchart of the OSI tunnel state check response waiting process performed by the OSI tunnel protocol processing part 24. This process is performed after the state becomes the OSI tunnel state check response waiting state in step 28. First, it is judged whether the OSI tunnel state check response is received from the NE at the other end within a predetermined time after the OSI tunnel state check command is sent.

When the OSI tunnel state check response is received within a predetermined time, it is judged whether the status of the OSI tunnel state check response is active in step 32. When the status is active, the OSI tunnel protocol processing part 24 deletes the OSI tunnel of the alternative route in step 34, and continues data transmission by using the OSI tunnel of the recovered route. Then, the process ends. Since the recovered route is the minimum cost route, this returning process is performed.

When the OSI tunnel state check response can not be received in a predetermined time in step 30, or, the status is inactive in step 32, the OSI tunnel protocol processing part 24 changes the status corresponding to the OSI tunnel of the failed route in the OSI tunnel table 40 to inactive, and continues data transmission by using the OSI tunnel of the alternate route. Then, the process ends.

Accordingly, in this embodiment, since generation and deletion of the OSI tunnel can be performed automatically, management man-hour can be decreased. In addition, the setting error due to manual setting can be prevented so that malfunction can be prevented. In addition, each NE can know newest information automatically even when status of reachable IP networks which are connected by the OSI seven layers changes. Therefore, information can be reflected more speedily and efficiently compared with a method in which information is transmitted and changed manually. In addition, since the IP packet is transmitted by using the OSI network in addition to the IP network, transmission efficiency and transmission speed of IP packets improve. In addition, since the OSI tunnel exists only when it is necessary, load of the NE which performs the OSI tunnel transmit/receive process can be decreased.

In addition, reliability of data transmission can be improved by the switching process of the OSI tunnel. Further, since most efficient route can be used maximally by the OSI tunnel returning function, the data transmission efficiency can be always maximum.

As mentioned above, according to the present invention, a setting error or management complexity due to manual setting can be resolved.

In addition, by preventing that an OSI tunnel which is not used for a long time remains, traffic bandwidth can be used efficiently since bandwidth occupation can be eliminated.

In addition, a new OSI tunnel is generated by using an alternate route and the OSI tunnel is switched to the new OSI tunnel when a failure occurs in a route of the OSI tunnel. Therefore, since data transmission can be performed by using the alternate route, reliability can be improved. Further, since most efficient route can be used maximally, data transmission efficiency can always be the best.

The present invention is not limited to the specifically disclosed embodiments, and variations and modifications may be made without departing from the scope of the invention.

What is claimed is:

1. An OSI tunnel routing method in which an IP packet which is encapsulated in an OSI packet is transmitted between transmission apparatuses each connected to an IP network in which said transmission apparatuses form an OSI network, said method comprising the steps of:
said transmission apparatuses exchanging reachable IP network addresses and each own OSI network address on said OSI network;
each of said transmission apparatuses generating an OSI tunnel table which includes OSI network addresses of said transmission apparatuses and said reachable IP network addresses; and a first transmission apparatus in said transmission apparatuses which receives an request to access an IP address determining a second transmission apparatus which can transfer data for said IP address by referring to said OSI tunnel table, and generating an OSI tunnel between said first transmission apparatus and said second transmission apparatus.

2. The OSI tunnel routing method as claimed in claim 1, further comprising the step of:
deleting said OSI tunnel when said OSI tunnel is not used for a predetermined time.

3. The OSI tunnel routing method as claimed in claim 1, further comprising the step of:
generating a new OSI tunnel by using an alternate route and switching said OSI tunnel to said new OSI tunnel when a failure occurs in a route of said OSI tunnel.

4. The OSI tunnel routing method as claimed in claim 3, further comprising the step of:
switching said new OSI tunnel back to said OSI tunnel when said route recovers from said failure within a predetermined time.

5. The OSI tunnel routing method as claimed in claim 1, further comprising the step of:
a third transmission apparatus in said transmission apparatuses receiving an address resolution request, and sending a MAC address of said third transmission apparatus when said address resolution request is for an IP address which is reachable by said third transmission apparatus.

6. The OSI tunnel routing method as claimed in claim 1, further comprising the step of:
said first transmission apparatus sending an OSI tunnel generation request to said second transmission apparatus when generating said OSI tunnel.

7. The OSI tunnel routing method as claimed in claim 6, further comprising the step of:
said second transmission apparatus receiving said OSI tunnel generation request, generating an OSI tunnel, and sending an OSI tunnel generation response to said first transmission apparatus.

8. The OSI tunnel routing method as claimed in claim 1, further comprising the step of:
said first transmission apparatus sending an OSI tunnel deletion request to said second transmission apparatus when said OSI tunnel is not used for a predetermined time.

9. The OSI tunnel routing method as claimed in claim 8, further comprising the step of:
said second transmission apparatus deleting said OSI tunnel when receiving said OSI tunnel deletion request, and sending an OSI tunnel deletion response to said first transmission apparatus.

10. A transmission apparatus which transmits an IP packet which is encapsulated in an OSI packet to another transmission apparatus in which each of said transmission apparatus and said another transmission apparatus is connected to an IP network, and said transmission apparatus and said another transmission apparatus form an OSI network, said transmission apparatus comprising:
an OSI tunnel propagation part exchanging reachable IP network addresses and an own OSI network address on said OSI network;
an OSI tunnel table generating part generating an OSI tunnel table which includes said OSI network address and said reachable IP network addresses; and
an OSI tunnel generation part, when said transmission apparatus receives an request to access an IP address, determining a first transmission apparatus which can transfer data for said IP address by referring to said OSI tunnel table, and generating an OSI tunnel between said transmission apparatus and said first transmission apparatus.

11. The transmission apparatus as claimed in claim 10, further comprising:
an OSI tunnel deletion part deleting said OSI tunnel when said OSI tunnel is not used for a predetermined time.

12. The transmission apparatus as claimed in claim 10, further comprising:
an OSI tunnel switching part generating a new OSI tunnel by using an alternate route and switching said OSI tunnel to said new OSI tunnel when a failure occurs in a route of said OSI tunnel.

13. The transmission apparatus as claimed in claim 12, wherein said OSI tunnel switching part switches said new OSI tunnel back to said OSI tunnel when said route recovers from said failure within a predetermined time.

14. The transmission apparatus as claimed in claim 10, further comprising:
an address resolution part receiving an address resolution request, and sending a MAC address of said transmission apparatus when said address resolution request is for an IP address which is reachable by said transmission apparatus.

15. The transmission apparatus as claimed in claim 10, said OSI tunnel generation part comprising:
an OSI tunnel generation request part sending an OSI tunnel generation request to said first transmission apparatus.

16. The transmission apparatus as claimed in claim 15, said OSI tunnel generation part further comprising:
an OSI tunnel generation response part receiving said OSI tunnel generation request, generating an OSI tunnel, and sending an OSI tunnel generation response to an transmission apparatus which sent said OSI tunnel generation request.

17. The transmission apparatus as claimed in claim 11, said OSI tunnel deletion part comprising:
an OSI tunnel deletion request part sending an OSI tunnel deletion request to an transmission apparatus on the other end of an OSI tunnel which is not used for a predetermined time.

18. The transmission apparatus as claimed in claim 17, said OSI tunnel deletion part further comprising:
an OSI tunnel deletion response part deleting said OSI tunnel which is not used for a predetermined time when receiving said OSI tunnel deletion request, and sending an OSI tunnel deletion response to an transmission apparatus which sent said OSI tunnel deletion request.

* * * * *